US009325920B2

(12) United States Patent
Van Nieuwenhove et al.

(10) Patent No.: US 9,325,920 B2
(45) Date of Patent: Apr. 26, 2016

(54) PROCESSING OF TIME-OF-FLIGHT SIGNALS (71) Applicant: SOFTKINETIC SENSORS NV, Brussels (BE)

(72) Inventors: Daniel Van Nieuwenhove, Brussels (BE); Tomas Van Den Hauwe, Aalst (BE); Reimer Grootjans, Antwerp (BE); Ward Van Der Tempel, Muizen (BE)

(73) Assignee: Softkinetics Sensors NV, Brusells (BE)

( * ) Notice: Subject to any disclaimer, the term of this patent is extended or adjusted under 35 U.S.C. 154(b) by 0 days.

(21) Appl. No.: 14/347,324

(22) PCT Filed: Jan. 10, 2013

(86) PCT No.: PCT/EP2013/050407
§ 371 (c)(1),
(2) Date: Mar. 26, 2014

(87) PCT Pub. No.: WO2013/104717
PCT Pub. Date: Jul. 18, 2013

(65) Prior Publication Data
US 2014/0313376 A1 Oct. 23, 2014

(30) Foreign Application Priority Data

Jan. 10, 2012 (EP) .................................... 12150687

(51) Int. Cl.
*H04N 5/357* (2011.01)
*G01S 17/89* (2006.01)
*G01S 7/486* (2006.01)

(52) U.S. Cl.
CPC .............. *H04N 5/357* (2013.01); *G01S 7/4865* (2013.01); *G01S 17/89* (2013.01)

(58) Field of Classification Search
CPC .......... G01C 3/08; G01S 17/08; G01S 7/4865
USPC .................................................. 356/3.01–5.15
See application file for complete search history.

(56) References Cited

U.S. PATENT DOCUMENTS

2007/0098388 A1* 5/2007 Turley et al. .................. 396/111
2014/0160459 A1* 6/2014 Huber et al. ................. 356/5.01

OTHER PUBLICATIONS

Payne Andrew D., Jongenelen Adrian P.P., Dorrington Adrian A. Cree Michael J., Carnegie Dale A.: "Multiple frequency range imaging to remove measurement ambiguity", 9th Conference on Optical 3-D Measurement Techniques, Jul. 1-Jul. 3, 2009, pp. 139-148, XP002660844, Vienna.

*Primary Examiner* — Luke Ratcliffe
(74) *Attorney, Agent, or Firm* — Duane Morris LLP; J. Rodman Steele, Jr.; Gregory M. Lefkowitz (57) ABSTRACT Described herein is a method and sensor of processing time-of-flight (TOF) signals in a TOF camera system including an illumination unit and an imaging sensor. The method comprises illuminating the scene with light at a first frequency, detecting reflected light from at least one object in the scene at the first frequency, and determining a phase measurement using I and Q values. In addition, the scene is illuminated with light at a second frequency, the second frequency being $2^{-n}$ of the first frequency where n=1, 2, . . . , etc., and the signs of I and Q values for both the first and second frequencies is used to determine the presence of aliasing in the phase measurement so that it can be corrected. The phase measurement is then corrected for aliasing and the effective range of the TOF camera system is extended by multiples of 2n. In addition, relative signal strength needs to be considered in accordance with the reflectivity of objects within the scene. For a reflectivity of 4% and no aliasing, the ability to detect an object decreases with distance (30). For an aliased phase measurement for an object with a reflectivity of 100%, the ability to detect the object is substantially constant (35).

15 Claims, 6 Drawing Sheets

PROCESSING OF TIME-OF-FLIGHT SIGNALS

CROSS-REFERENCE TO RELATED APPLICATIONS

This application is a §371 national stage entry of International Application No. PCT/EP2013/050407, filed Jan. 10, 2013, which claims priority to European Patent Application No. 12150687.7 filed Jan. 10, 2012, the entire contents of which are incorporated herein by reference.

FIELD OF THE INVENTION

The present invention relates to improvements in or relating to the processing of time-of-flight (TOF) signals, and is more particularly concerned with de-aliasing of such time-of-flight signals. In particular the present invention relates to TOF sensors, cameras, etc. including de-aliasing of time-of-flight signals

BACKGROUND TO THE INVENTION

Time-of-flight (TOF) camera systems are known for providing information concerning the distance to an object by analysis of the Time of Flight from a light source to the object and back. One particular application is a camera capable of capturing a three-dimensional (3-D) image of a scene, that is, two-dimensional information, as well as, depth or distance information. Such camera systems are utilised in many applications where depth or distance information from a fixed point needs to be determined. Typically, the depth or distance information is measured from the TOF camera system.

The basic operational principle of a TOF camera system is to illuminate a scene with modulated light, such as pulses. The modulated light such as these light pulses are reflected back from objects within the scene and a lens collects the reflected light and forms an image of objects in the scene on an imaging sensor, and in particular, on a sensor plane of the sensor. Depending on the distance of objects from the camera, a delay is experienced between the emission of the modulated light, e.g. pulse and the reception of its reflection at the camera, for example, an object 2.5 m away from the camera causes a time delay of 16.66 ns. However, when using pulses, the pulse width of each light pulse determines the camera range, and, for example, for a pulse width of 50 ns, the range is limited to 7.5 m. As a consequence, the illumination of the scene becomes critical to the operation of a TOF camera system, and the requirements for illumination units necessitate the use of specialised light sources, such as, light emitting diodes (LEDs) or lasers, to generate such short light pulses.

Another main component of a TOF camera system is the imaging sensor. The imaging sensor typically comprises an array of pixels that form an image of the scene. In addition, the output of the pixels can be used to determine the time-of-flight of light from an illumination unit to an object in the scene and light reflected back to the imaging sensor from the object. The time-of-flight can be calculated in a separate processing unit which is coupled to the sensor or may be integrated into the sensor. Various methods are known for measuring the timing of the light as it travels from the illumination unit to the object and from the object back to the imaging sensor.

As is well-known, each pixel effectively comprises a photosensitive element which receives incident light and converts it into an electrical signal, for example, a current signal. In analogue timing imaging sensors, the pixels are connected to switches that direct the current signal to a memory acting as a summation device. In digital timing imaging sensors, high frequency counters are used for sensing the current signal. The presence of background light may cause distances to be erroneously determined as the pixels receive additional light not reflected from objects within the scene.

Naturally, imaging optics and processing electronics also form part of a TOF camera. The imaging optics gather the reflected light from objects in the scene and filter out light that is not in the same wavelength or frequency of the light emitted by the illumination unit. By filtering out light at unwanted wavelengths or frequencies, background light can effectively be suppressed. The processing electronics include drivers for both the illumination unit and the imaging sensor so that these components can accurately be controlled to ensure that a high resolution image of the scene can be obtained.

TOF camera systems tend to cover wide ranges from a few millimeters up to several kilometers depending on the type of imaging sensor utilised. Such a TOF camera system may have distance resolutions that vary from the sub-centimeter to several centimeters or even meters, depending on the configuration of the TOF camera system being used in a particular application. Technologies that can be used with TOF camera systems include pulsed light sources with digital time counters, radio frequency (RF) modulated light sources with phase detectors, and range-gated imagers.

Whilst it may be relatively easy to extract the distance information from the output of the imaging sensor for an object in a scene, TOF systems suffer from the impact of background light as discussed above; interference if more than one TOF camera system is operating with overlapping fields of view of the scene; and multiple reflections. Interference between different TOF camera systems can be reduced either by using time-multiplexing techniques or by utilising a different modulation frequency for each TOF camera system. As TOF camera systems illuminate an entire scene, multiple reflections may be obtained as the illuminating light reaches each object along several paths. This has the effect that the measured distance of the object from the TOF camera system may be determined as being greater than or less than its actual distance from the TOF camera system. This is a major drawback of conventional TOF camera systems. The removal of measurement ambiguity in range imaging systems has been described by A. D. Payne et al. in an article entitled "Multiple Frequency Range Imaging to Remove Measurement Ambiguity", in which two different modulation frequencies are superimposed in a single capture to overcome the problem of phase ambiguity leading to incorrect distance measurements, (http://researchcommons.waikato.ac.nz/bitstram/10289/4032/1/Multiple %20Frequency %20Range%20Imaging.pdf).

In an article entitled "Resolving Depth Measurement Ambiguity with Commercially Available Range Imaging Cameras" by S. H. McClure et al., Proc. SPIE-IS&T Electronic Imaging, SPIE vol. 7538, pp. 75380K, 2010, software post-processing is used to resolve depth ambiguity. The range data is processed to segment the scene into separate objects and the average intensity of each object is used to determine which pixels are outside non-ambiguous range. The method can be used with any range imaging camera system, for example, robot vision where the camera may be moving during image captures, has reduced sensitivity to differences in reflectance from objects in the scene. In signal processing and related disciplines, aliasing refers to an effect that causes different signals to become indistinguishable (or aliases of one another) when sampled. Temporal aliasing is when the samples become indistinguishable in time. Temporal aliasing can occur when the signal being sampled periodically also has periodic content. In TOF systems aliasing results in ambiguity as to the distance between the light source and object from the might be reflected.

"Phase unwrapping" is described in an article entitled "Probabilistic Phase Unwrapping for Time-of-Flight Cameras" by David Droeschel, Dirk Holz and Sven Behnke, Proceedings of Joint 41st International Symposium on Robotics and 6th German Conference on Robotics, Munich, June 2010. A number of relative phase shifts are inferred from a wrapped phase signal where a probabilistic approach is used to detect phase jumps or phase shifts based on discontinuities in a depth image containing the distance information. The authors have also described phase unwrapping in "Multi-frequency Phase Unwrapping for Time-of-Flight Cameras", Proceedings of IEEE/RSJ International Conference on Intelligent Robots and Systems (IROS), Taipei, Taiwan, October 2010.

In an article entitled "A New Active 3D-Vision System Based on RF-Modulation Interferometry of Incoherent Light" by R. Schwarte et al., Photonics East-Intelligent Systems and Advanced Manufacturing, Proceedings of the SPIE, Vol. 2588, Philadelphia, 1995, a method for processing signals from TOF camera system is disclosed in which an autocorrelation function utilises a phase shift algorithm where phase is proportional to distance from the TOF camera system and where measurement uncertainty can be determined in accordance with the number of phase measurements, the modulation contrast, the electrons in the active signal and in the noise signal and the wavelength of the modulation signal. Such systems are described as being useful for both pedestrian and vehicle safety systems.

In U.S. Pat. No. 7,791,715, a method of de-aliasing TOF phase-derived data by utilising at least two modulation frequencies to acquire phase data is described. Pixel detection information is captured in at least two discrete phases, preferably four, to implement de-aliasing. These discrete phases represent shifts between the modulator in the TOF camera system and the illumination unit. This is different to the desired phase shift detected between the emitted light and the reflected light from the object received by an imaging sensor. The discrete phases are subtracted from one another to cancel out fixed pattern offset between the modulator and the illumination unit. By using two modulation frequencies, the system behaves as if phase data is collected whilst it is being operated at a very slow modulation frequency which is proportional to the difference between two modulation frequencies. The use of multiple modulation frequencies provides better depth measurement certainty and precision than can be achieved using only one modulation frequency.

The use of multiple modulation frequencies is also described in "A Time-Of-Flight Depth Sensor—System Description, Issues and Solutions" by S. Burak Gokturk, Hakan Yalcin, and Cyrus Bamji of Canesta Inc. In one embodiment, two modulation frequencies are used where results are combined to provide a more accurate depth value for an object when compared to a single modulation frequency. In addition, the non-ambiguous or unambiguous range is extended. In another embodiment, a number of measurements are made with modulation frequencies at f, 2f, 4f, 8f etc., the results at each modulation frequency being combined to provide an accurate value of distance over a long non-ambiguous or unambiguous range can be obtained. In each successive measurement the resolution is doubled whilst the range is halved.

Due to the periodical nature of the illumination source used, namely, the modulation of the illumination source, distance range intervals tend to repeat. This phenomenon is known as TOF aliasing as described above. Currently, a limited number of techniques exist to solve this problem of TOF aliasing to enable the TOF camera system to provide a non-ambiguous or unambiguous distance of sufficiently long an interval for the particular application in which the TOF camera system is implemented. These techniques, however, have a number of known limitations as they tend to be quite complex to implement, require intensive computations, are not robust or cause bandwidth overheads in the data transport, or lead to a decrease of depth accuracy or general camera performance.

SUMMARY OF THE INVENTION

It is therefore an object of the present invention to provide alternative devices and methods for processing of time-of-flight (TOF) signals, and more particularly to device and method for de-aliasing of such time-of-flight signals. In particular an object of the present invention relates to providing alternative TOF sensors, cameras, etc. including de-aliasing of time-of-flight signals An advantage of the present invention is that the de-aliasing of TOF signals can be carried out in an efficient way. Aspects of embodiments of the present invention are:
a) using two correlation processes, a first one for determining a distance or depth value and a second one for determining if there is aliasing present in the first correlation. These two processes can be made independent of each other.
b) The first correlation of a) above can be given a higher priority than the second correlation, e.g. the computational effort for the first correlation can be higher for the first than for the second and/or the integration time for signals in the first correlation can be longer than for the second.
c) Whereas one correlation process is used to obtain depth or distance information, two methods or processes can be used to determine if there is alisaing. The first of these processes preferably reduces the number of possible aliased values and the second process then focuses on or reduces the number of possible aliased values down to one or close to one, e.g. by a process of elimination.
d) Adjudication processes, i.e. as to whether there is aliasing or not are preferably based on simple arithmetic, e.g. greater than or less than determinations.

In accordance with a first aspect of the present invention, there is provided a method of determining the presence of aliasing or avoiding aliasing within certain limits in correlation measurements in a time-of-flight system having an imaging sensor and being for use with an illumination unit, the illumination unit being adapted to illuminate a scene with modulated light, the system being adapted to obtain correlation measurements by applying a correlation signal to modulated light reflected from the scene,
the method comprising:
a) detecting reflected light from at least one object in the scene;
b) determining by one or more first correlation measurements a first correlation between a first correlation signal and the reflected light received at the imaging sensor the first correlation signal having a periodic waveform of a first frequency and the first correlation measurement providing a value of a parameter related to a distance from the imaging sensor to the at least one object;
c) determining by one or more second correlation measurements a second correlation between the reflected light received at the imaging sensor and a second correlation signal, the second correlation signal having a periodic waveform of a second frequency lower than the first frequency;

d) determining for that value of the parameter the presence of aliasing from the second correlation measurement.

The first and second signal can be used to modulate light for illuminating the scene the second frequency being different from the first frequency. Or a third signal that is used for modulating the light from the illumination unit can have a different duty cycle than the second signal used for the second correlation. The second signal may be offset compared to the first signal. A third process can be provided for determining a distance related parameter, i.e. the distance between the sensor and the scene in order to eliminate any possible aliasing that still could exist after the second correlation step. This distance related parameter can be a confidence level, e.g. a reflectance map.

In accordance with a another aspect of the present invention, there is provided a method of determining the presence of aliasing in phase measurements in a time-of-flight system e.g. at least within certain limits, the system having an imaging sensor and being for use with an illumination unit, the illumination unit being adapted to illuminate the scene with modulated light having a periodic waveform, the system being adapted to obtain correlation measurements by applying a correlation signal to modulated light reflected from the scene;

the method comprising the steps of:
a) providing a modulation signal for use by the illumination unit for illuminating the scene with light modulated at the first frequency and second frequency;
b) detecting reflected light from at least one object in the scene at the first frequency;
c) determining a first correlation between the modulation signal and the reflected light received at the imaging sensor;
d) determining a second correlation between the illuminating light emitted by the illumination unit and the reflected light received at the imaging sensor; and
e) determining from the first and/or second correlation in-phase and/or quadrature components of the detected reflected light, and using the in-phase and/or quadrature components to determine a presence of aliasing.

The presence or ambiguity of aliasing can be determined to within certain distance limits, e.g. as determined by the first and second frequencies and the relationship between them. This ambiguity means that the ToF distance can be determined reliably up to a certain distance. The effect or ambiguity of aliasing can be reduced still further in some embodiments when a confidence level is determined for the distance measurement based on other distance dependent factors or processes than the ToF. Such distance related factors are for example, passive like the amount of IR light reflected from the object, the size of speckle in the returning image, or may be active such as projecting a diverging pattern and measuring the size of pattern as seen by the sensor. In accordance with embodiments of the present invention a confidence threshold is applied This confidence threshold can be based for example on a distance dependent property of the objects of the scene which can be detected. The threshold can be applied pixel-by-pixel. In alternative embodiments a confidence threshold can be applied based on a part of the complete image, e.g. based on an object or objects that can detected in the image by image processing techniques or for the whole image. For example the reflectivity of objects to be detected within the scene can be used to confirm that the distance measured is likely to be correct. By using an intelligent threshold process in which the confidence threshold is distance dependent, it is possible to increase the maximum distance that can practically be supported by the TOF methods of the present invention or to decrease the minimum reflectivity so that the maximum distance that can be detected reliably can be extended.

The term quadrature refers to signals having phase information. Typically such signals are 90° out of phase but the present invention is not limited to quadrature meaning 90°. Other angles which tile into 360° could be used such as 60, 30° etc. What is used by embodiments of the present invention is that two signals at different frequencies will land in different sectors of a constellation diagram in such a way that aliasing can be determined, at least within certain limits. Determining aliasing can be done by examining decision areas in a constellation diagram.

Preferably the presence of aliasing is determined from the sign of the in-phase and/or quadrature components of the detected reflected light.

Preferably a phase measurement is determined from the correlation at different phase offsets for the first frequency. Preferably a phase measurement is determined from the correlation at different phase offsets for the second frequency. Optionally the second frequency is $2^{-n}$ of the first frequency where n=1, 2, . . . , etc.

Preferably, the step of determining I and Q values, is preferably done at the first frequency and/or the second frequency. The phase measurement step using the first and/or second frequency may comprise using the I and Q values to determine the phase measurement.

In embodiments of the present invention, determining presence of aliasing involves carrying out a simple arithmetic operation such as determining the sign of the I and/or Q values, e.g. by comparing I and/or Q values to zero at the first frequency and/or at the second frequency. Sectors of a constellation circle may be used to associate the different phase offsets with a decision algorithm to determine the presence of aliasing.

In another aspect the present invention provides a time of flight or range finding sensor having means for determining the presence of aliasing or to avoid aliasing within certain limits, the sensor being for use with a first and a second signal and also being for use with an illumination unit, the illumination unit being adapted to illuminate the scene with modulated light modulated, the system being adapted to obtain correlation measurements by applying a correlation signal to modulated light reflected from the scene, the sensor comprising:
a) means for providing the first signal for use by the illumination unit for illuminating the scene;
b) means for detecting reflected light from at least one object in the scene at the first frequency;
c) means for determining a first correlation between the modulation signal and the reflected light received at the imaging;
d) means for determining a second correlation between the reflected light received at the imaging sensor and the second signal;
e) means for determining from the first correlation a distance from the imaging sensor to the scene and determining the presence of aliasing from the second correlation.

Means can be provided so that the second signal can be used to modulate light for illuminating the scene with a second frequency that is different from the first frequency. Or means can be provided so that a third signal that is used for modulating the light from the illumination unit can have a different duty cycle than the second signal used for the second correlation. Means can be provided that the second signal may be offset compared to the first signal means can be provided for determining a distance related parameter, i.e. related to the distance between the sensor and the scene in order to eliminate any possible alisaing that still could exist after the second correlation step. This distance related parameter can be a confidence level, e.g. a reflectance map. In yet another aspect the present invention provides a time of flight or range finding sensor having means for determining the presence of aliasing or to avoid aliasing within certain limits, the sensor having an imaging sensor and being for use with an illumination unit, the illumination unit being adapted to illuminate the scene with modulated light having a periodic; comprising:

a) means for providing a modulation signal for use by the illumination unit for illuminating the scene with light modulated at a first frequency and a second frequency;
b) means for detecting reflected light from at least one object in the scene;
c) first means for determining a first correlation between the modulation signal and the reflected light received at the imaging sensor for the first frequency;
d) second means for determining a second correlation between the illuminating light transmitted by the illumination unit and the reflected light received at the imaging sensor for the second frequency; and
e) third means for determining from the first and/or second correlation in-phase and/or quadrature components of the detected reflected light, and using the in-phase and/or quadrature components to determine a presence of aliasing.

The means for detecting reflected light can be a sensor with pixels. The means for determining correlations and/or the means for determining the in-phase and/or quadrature components or means for determining the presence of aliasing can be a processing unit linked to or integrated with the sensor. For example these means may be provided by a computer, an output of the sensor being linked to the computer.

The presence or ambiguity of aliasing can be determined to within certain limits depending on the first and second frequency and their separation or relationship between them. This ambiguity means that the ToF distance can be determined reliably up to a certain distance. The effect or ambiguity of aliasing can be reduced still further in some embodiments when a confidence level is determined for the distance measurement based on other factors or processes than ToF. In accordance with embodiments of the present invention a confidence threshold is applied This confidence threshold can be based for example on a distance dependent property of the objects of the scene which can be detected. Such distance related factors are for example, passive like the amount of IR light reflected from the object, the size of speckle in the returning image, or may be active such as projecting a diverging pattern and measuring the size of pattern as seen by the sensor The threshold can be applied pixel-by-pixel. In alternative embodiments a confidence threshhold can be applied based on a part of the complete image, e.g. based on an object or objects that can detected in the image by image processing techniques or for the whole image. For example the reflectivity of objects to be detected within the scene can be used to confirm that the distance measured is likely to be correct. By using an intelligent threshold process in which the confidence threshold is distance dependent, it is possible to increase the maximum distance that can practically be supported by the TOF camera system of the present invention or to decrease the minimum reflectivity so that the maximum distance that can be detected reliably can be extended.

Preferably the third means is adapted to determine the presence of aliasing from the sign of the in-phase and/or quadrature components of the detected reflected light. Preferably the first means is adapted to make a phase measurement from the correlation at different phase offsets for the first frequency. Preferably the second means is adapted to make a phase measurement from the correlation at different phase offsets for the second frequency.

Optionally the second frequency is 2' of the first frequency where n=1, 2, . . . , etc.

Preferably the third means for determining is adapted to determine I and Q values at the first frequency and/or the second frequency.

In embodiments of the present invention the third means for determining is adapted to determine the presence of aliasing by determining the sign of the I and/or Q values, e.g. by comparing I and/or Q values to zero at the first frequency and/or at the second frequency.

Any of the above sensors may be part of a TOF device.

BRIEF DESCRIPTION OF THE DRAWINGS

For a better understanding of the present invention, reference will now be made, by way of example only, to the accompanying drawings in which:—

DESCRIPTION OF THE INVENTION

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

In the rest of this document the principles of dealiasing will be described based on phase measurements. It is to be noted however that the invention can also be used for other periodic signals (e.g. pseudo random bit stream or other digital signals).

Figure 7:
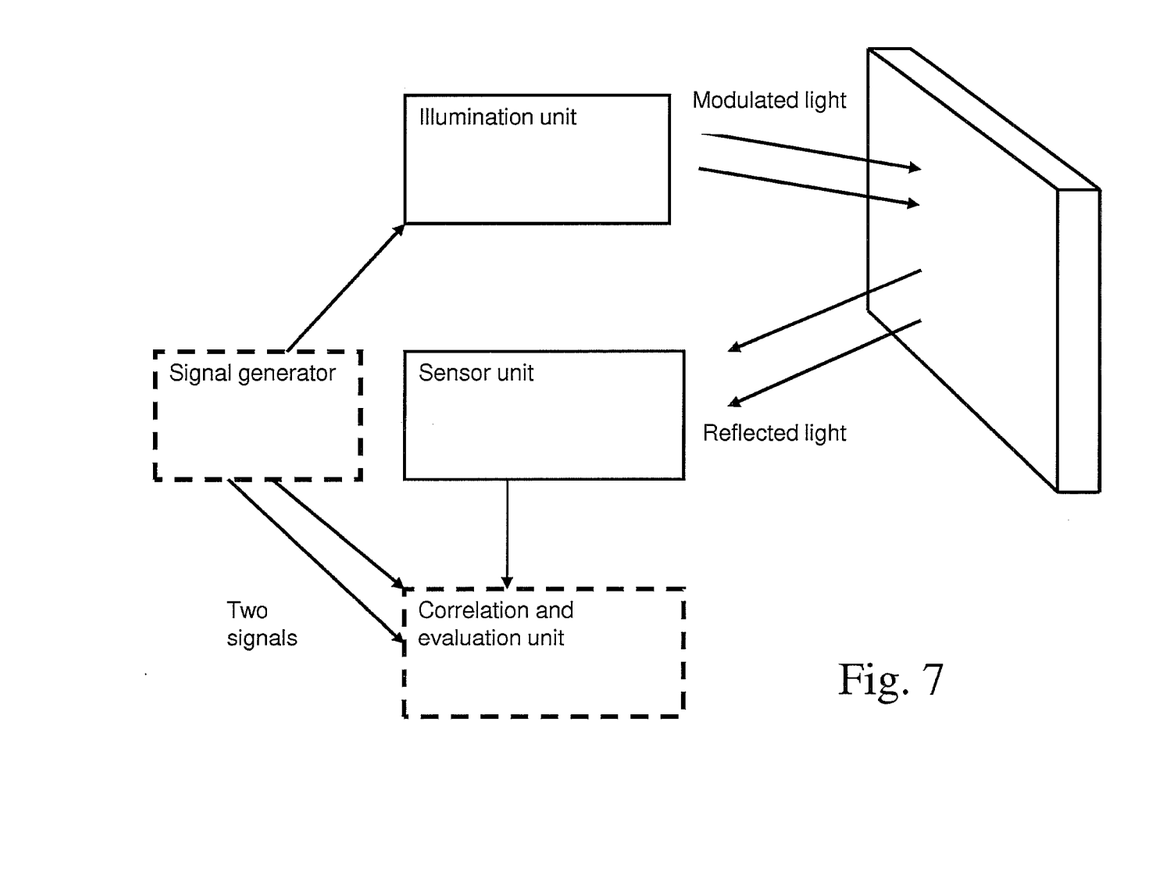
FIG. 7 is a schematic view of a ToF system.

With reference to FIG. 7 in a TOF measurement, the round-trip time for illuminating light from a TOF camera system having an illumination unit to travel to points in a scene and reflected light from those points back to a sensor unit of the TOF camera system is measured. In a conventional TOF camera system, the illuminating light comprises periodically modulated light which is generated by driving the illumination unit with a signal from a signal generator. In one option for determining the time of flight the phase delay between the emitted light from the TOF camera system to illuminate the scene and received reflected light from the scene is determined. This can be done in a correlation and evaluation unit which receives the modulation signal from the signal generator.

This phase delay can then, using the period length and speed of light, be converted into a measured distance, that is, the distance of at least one point of an object from the TOF camera system. This can be done on a pixel-by-pixel basis. Due to the periodic nature of the modulated light, at certain distances the phase delay measurements are repeated (or aliased), this happens once the phase delay exceeds multiples of the period. This repetition of phase delay measurements is referred to as "aliasing" of the signal as described above. In essence, a TOF distance measurement, D, can be determined as:

$$D = \left(\frac{c}{2f}\right) * \left(\frac{\text{phase\_deg} + k.360}{360}\right)$$

where c is the speed of light, f is the frequency of the modulated light, phase_deg is the phase shift in degrees, and k is related to the number of periods that have "aliased". The first factor in this equation is the aliasing distance, for a system with no provision for de-aliasing, this corresponds to the unambiguous distance, being:

$$D = \left(\frac{c}{2f}\right)$$

This distance represents the maximum distance that can be covered within one period. Larger distances will cycle k, and will therefore, if present in the image, be aliased and require knowledge on k in order to be measured unambiguous.

A distance measure based on this principle is in theory never uniquely defined, but corresponds to an unlimited number of possible distance measures. Today's systems assume the value of k to equal zero for all measurements. Therefore, if in reality k>0 for some pixels, the assumption is invalid and the measurements incorrect.

In accordance with aspects of the present invention, a novel de-aliasing method is described which can be used to identify k is 0, or within a certain range, and/or identify the exact value of k. Embodiments of the present invention describe a method of determining the presence of aliasing or avoiding aliasing within certain limits in correlation measurements in a time-of-flight system having an imaging sensor and being for use with an illumination unit, the illumination unit being adapted to illuminate a scene with modulated light, the system being adapted to obtain correlation measurements by applying a correlation signal to modulated light reflected from the scene. The steps of the method can be carried out in any suitable order. The method may comprise:

a) detecting reflected light from at least one object in the scene;
b) determining by one or more first correlation measurements a first correlation between a first correlation signal and the reflected light received at the imaging sensor the first correlation signal having a periodic waveform of a first frequency and the first correlation measurement providing a value of a parameter related to a distance from the imaging sensor to the at least one object;
c) determining by one or more second correlation measurements a second correlation between the reflected light received at the imaging sensor and a second correlation signal, the second correlation signal having a periodic waveform of a second frequency lower than the first frequency;
d) determining for that value of the parameter the presence of aliasing from the second correlation measurement.

The parameter can be a phase difference. In the method a first phase measurement can be determined from the first correlation measurement at different phase offsets for the first frequency. Preferably a signal integration time of the detected reflect signal in the first correlation measurement is longer than a signal integration time of the second correlation measurement. This increases the accuracy of the distance measurement while still resolving aliasing.

The second correlation signal can have a different duty cycle from the duty cycle of the detected reflected modulated light with which it is correlated. The duty cycle of the second correlation signal can be 50%.

The first and/or second correlation measurements are combined into aliasing indicators. Such aliasing indicators can be I and Q values. Another indicator can be based on a distance related factor such as reflectivity from the objects in the scene.

The method may further comprise the steps of:
determining the second correlation measurement using different phase offsets for the second frequency; and
determining in-phase and/or quadrature components of the detected reflected light from the one or more second correlation measurements, and using the in-phase and/or quadrature components to determine a presence of aliasing.

The presence of aliasing can be determined by using a confidence level determined from measuring a distance related factor. The distance related factor can be an amount of reflected light, a size of a speckle pattern, a size of an imposed pattern. The presence of aliasing can be determined from indicators such as the sign of the in-phase and/or quadrature components of the detected reflected light.

A second phase measurement can be determined from the second correlation measurement at different phase offsets for the second frequency. The first frequency is different from, e.g. higher than or a multiple of the second frequency.

The step of determining in-phase and/or quadrature components can comprise determining I and Q values at the first frequency and/or the second frequency.

Presence of aliasing can be determined from indicators such as the sign of the I and/or Q and/or the difference of I and Q absolute values.

Embodiments describe a time of flight or range finding sensor unit, having means for determining the presence of aliasing or to avoid aliasing within certain limits, the sensor being for use with an illumination unit, the illumination unit being adapted to illuminate the scene with modulated light, the system being adapted to obtain correlation measurements by applying a correlation signal to modulated light reflected from the scene,
the sensor unit comprising:
a) first means for detecting reflected light from at least one object in the scene;
b) second means for determining by a first correlation measurement a first correlation between the first signal and the reflected light received at the imaging sensor, the first correlation measurement providing a value of a parameter related to a distance from the imaging sensor to the scene;
d) third means for determining by a second correlation measurement a second correlation between the reflected light received at the imaging sensor and a second signal, the second signal having a periodic waveform of a second frequency lower than the first frequency;

e) fourth means for determining, for that value, the presence of aliasing from the second correlation measurement.

The parameter can be a phase difference. The second means can be adapted to determine a first phase measurement from the first correlation measurement at different phase offsets for the first frequency.

Preferably the second and third means are adapted so that a signal integration time of the first correlation measurement is longer than an integration time of the second correlation measurement.

The second correlation signal can have a different duty cycle from the duty cycle of the detected reflected modulated light with which it is correlated. The duty cycle of the second signal can be 50%.

The third means for determining the second correlation can be adapted to perform the second correlation measurement at different phase offsets for the second frequency; and the sensor unit can be adapted to determine in-phase and/or quadrature components of the detected reflected light from the second correlation measurement, and the fourth means using the in-phase and/or quadrature components to determine the presence of aliasing.

The presence of aliasing can be determined by using a confidence level determined from a distance related factor. The distance related factor can be the amount of reflected light modulated at the first frequency and/or second frequency, the size of a speckle pattern, the size of an imposed pattern.

The means for determining in-phase and/or quadrature components can be adapted to determine the presence of aliasing from the sign of the in-phase and/or quadrature components of the detected reflected light.

The second means for determining can be adapted to make a phase measurement from the first correlation at different phase offsets for the first frequency.

The third means for determining can be adapted to make a phase measurement from the second correlation at different phase offsets for the second frequency.

The first frequency is different from, e.g. higher than or a multiple of the second frequency.

The fourth means for determining in-phase and/or quadrature components can be adapted to determine I and Q values at the second frequency.

The fourth means for determining in-phase and/or quadrature components can be adapted to determine the presence of aliasing by determining the sign of the I and/or Q values.

The first and/or second signal is preferably calibrated for a phase offset to avoid offset errors.

The sensor of the sensor unit can be for use with a correlation and evaluation unit that can include a processor such as a microprocessor or an FPGA.

Although a first and a second signal will be described for correlation with reflected light, the present invention includes the use of more signals which can be cascaded or repeatedly applied and these signals may also be at different frequencies than the first and second signal.

A first advantage, when determining whether or not k is 0, is that now the distance measure is a uniquely defined distance measure, thereby avoiding the system to output incorrect distance information in the cases where k>0, as explained above. A second advantage, when knowing the value of k, is that it enables furthermore the system to translate this identified information into a longer distance range. A third advantage is that higher modulating frequencies can be used, with possibly advantageous effects on the depth accuracy.

In some distance measurement techniques, such as TOF, an extra value for the intensity of the reflected active infrared light used in the measurement is also obtained, we will call this the confidence. The confidence drops with the square of distance.

A first approach in resolving the aliasing ambiguity is to look at the confidence to determine k. This is not a good solution as the confidence is not only a function of distance, but also of reflectivity of the surfaces in the scene. Therefore a very low confidence can correspond to an object more than a period away (k>0), or to a close by object with a very low reflectivity (e.g. a black leather jacket). Therefore, in order to rely on this principle, the reflectivity in the scene must be known for all pixels in the scene. In such cases the confidence can be used to determine k. In practice this is however seldom the case.

An approach used in this invention will rely partly on the confidence. A first approach is to suppress all pixels that can possibly have a k>0, based on confidence. As indicated above, the confidence does not allow the pixels with k>0 to be distinguished from the pixels close by, but with a lower reflectivity and both are suppressed. Therefore applying this principle one is assured that measurements with k>0 are suppressed but also good measurements below the aliasing distance under a certain reflectivity limit are suppressed. In first order this minimum reflectivity limit is proportional to the square of the maximum distance required for the application and inversely proportional to the square of the unambiguous distance. As it is an aim in many of the use cases of the technology to be compatible with high reflectivity as well as very low reflectivity levels e.g. for low reflective clothing materials, this reflectivity limit is a significant limitation of the above technique. It is therefore an aim of the invention to minimize this limit. This is obtained by increasing the unambiguous distance or reducing the maximum distance required for the application. The latter however offers little or no perspective as this is in most cases a fixed parameter defined by the application and will therefore not be considered in the rest of this document. The unambiguous distance can easily be increased by reducing the modulation frequency. This will however have a negative impact on the uncertainty on the distance measurements. Therefore other means of increasing unambiguous distance, as explained in this document, are important.

Using more complex confidence threshold mechanisms, such as an adaptive threshold being distance dependent, it is possible to increase the maximum supported distance with a certain reflectivity limit and/or decrease the minimum reflectivity limit.

For ease of explanation, a typical TOF camera system will be assumed throughout this description. In order to measure phase in a TOF camera system, the in-phase of I values and quadrature values or Q values, are determined. The term quadrature refers to signals having phase information. Typically, such signals are 90° out of phase but the present invention is not limited to quadrature meaning 90°. Other angles which tile into 360° could be used such as 60, 30° etc. Determining aliasing can be done by examining such decision areas in a constellation diagram.

In accordance with embodiments of the present invention, I and Q values, are determined. This is typically done by measuring a correlation between emitted and reflected light signals at a number of phase offsets, e.g. 2 or more, 3, 4 different phase offsets. The 4 offsets for example, are typically 0°, 90°, 180° and 270°. Using these measurements, the I and Q values are:

$I = M\_0 - M\_180$ $Q = M\_90 - M\_270$ where M_0, M_90, M_180 and M_270 are the measurements at 0°, 90°, 180° and 270° respectively.

I and Q can then in turn be used to calculate the phase, $\phi$, using standard trigonometric relationships:

$$\phi = \alpha \tan 2(Q, I)$$

The modulation frequency used as the illuminating light for the TOF measurement will be referred to as the first or base frequency (BF) throughout the following description. In addition, second or derived frequencies will be referred to in accordance with their relationship to the BF, for example, HALF and QUARTER, etc.

It is an aim of the present invention to provide also techniques that allow to distinguish aliasing by adding an extra but shorter measurement, next to the TOF distance measurement, to determine the aliasing status. It is an aim of the invention to keep the required integration time to take this measurement as low as possible, in order to save energy in the required illumination and have as much focus as possible and allowing a long integration time for the actual distance measurement. The longer the integration time the lower the uncertainty. The integration time available is limited however by the required frame rate, e.g. 20 ms for 50 fps. Therefore having a technique identifying aliasing in a very short timeframe is important and very advantageous.

In accordance with a first embodiment of the present invention, one extra measurement is made at a lower second frequency with the standard TOF technique described above. This measurement can, for example, be taken at a second frequency HALF, that is, half the first or BF. In that case, the system is able to discern k is even from k is odd, using the following relationships:

If QHALF>0→TOF measurement with k is even

If QHALF<0→TOF measurement with k is odd

Thus, only checking the sign of one measurement allows to reduce possible values for k to be either odd or even. Thus the unambiguous distance is increased a factor of 2, thereby reducing the reflectivity limit a factor of 4.

However, due to noise in this measurement, for example, when QHALF is very close to 0, the measurement can mistakenly be interpreted wrongly.

Alternatively, the IHALF measurements can also be used using the same relationships as above with the same issues of noise in the measurement.

To improve this, one could take temporal coherency of the measurements into account, and reject distances that change the full, or close to, aliasing distance, as these are likely due to the noise as explained above. The aliasing distance is typically quite large, e.g. 7.5 m for a 20 MHz modulation frequency. Next to, or together with, the temporal coherency, also the surrounding pixels can be taken into account.

Another way to increase robustness towards noise is to add extra redundancy in the measurements, for example, by not only check IHALF or QHALF, but both, and then using the sign of QHALF, IHALF and also the sign of QBF and IBF. In this way, four possible outcomes and conclusions can be obtained as will be described in more detail below.

QBF and IBF are typically readily available as these have to be calculated to complete the TOF measurement itself and will therefore not be considered as extra needed measurements.

Figure 1:
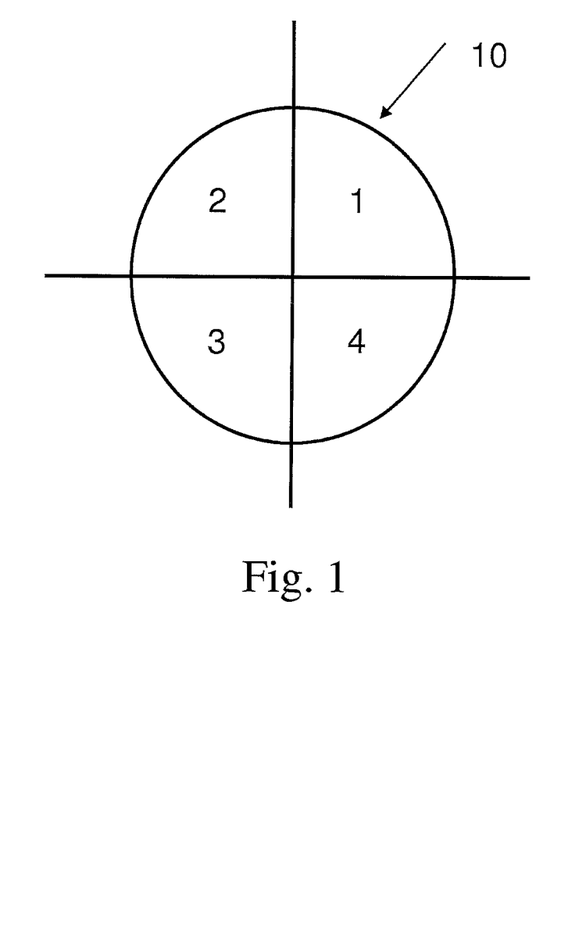
FIG. 1 illustrates a phase circle having four phase quadrants or sectors.

FIG. 1 illustrates a constellation diagram 10 divided into four quadrants 1, 2, 3, and 4. Each quadrant 1, 2, 3 and 4 corresponds to phase ranges between 0° and 90°, 90° and 180°, 180° and 270°, and 270° and 0° or 360° respectively.

With respect to first or base frequency and a second frequency that is half of the base frequency, Table 1 below illustrates, that each row corresponds to a HALF or low-frequency quadrant in the circle 10, and each column corresponds to a BF or high-frequency quadrant. For each measurement, the signs of QHALF, IHALF, QBF and IBF are then to be used to determine quadrants for the BF or first frequency and the HALF or lower frequency. Using these quadrants the value for the correct quadrant for the HALF or lower frequency is indicated in Table 1. This correct value is then used to determine odd and even sign of k, as indicated above. In this way, due to the measurement redundancy, up to 90° of noise can be corrected.

TABLE 1

| Case | BF_1 | BF_2 | BF_3 | BF_4 |
|---|---|---|---|---|
| HALF_1 | HALF_1 | HALF_1 | HALF_2 | HALF_4 |
| HALF_2 | HALF_3 | HALF_1 | HALF_2 | HALF_2 |
| HALF_3 | HALF_3 | HALF_3 | HALF_4 | HALF_2 |
| HALF_4 | HALF_1 | HALF_3 | HALF_4 | HALF_4 |

Therefore, first a confidence threshold must be set eliminating all measurements with possibly k>1, then knowing the HALF quadrant, a value of 'HALF_3' or 'HALF_4' means a single aliasing distance needs to be added, a quadrant value of 'HALF_1' or 'HALF_2' means no aliasing is present. Thus, one can achieve to double the unambiguous distance, by only adding a measurement of HALFQ and HALFI, and looking at the signs of HALFQ, HALFI, QBF, IBF.

As only the sign needs to be distinguished for the HALFQ and HALFI measurements, it is desirable to limit the amount of active light used to obtain these measurements. As indicated above, a noise of about 90° can be corrected using the technique. Therefore the system operation should be designed to avoid a noise higher than 90°, as can be done by a person skilled in the art of 3D Time-of-flight cameras.

Further a second important constraint is the offset between the measurements done at both frequencies. This offset is to be deduced in the above reasoning from the tolerable noise level of 90°. Therefore, it is important to reduce this offset as much as possible. This can for example be done by 1) phase-shifting a modulation signal or 2) computationally rotating one of the received correlations afterwards Reducing the offset can be done during the TOF camera calibration phase during production by measuring the phase for each frequency at a fixed known distance, and correcting for the measured offset. This offset value is stored in a digital memory and then used to apply a delay to one of the emitted light or reflected light to compensate for the offset.

In a typical implementation, the first or high modulation frequency is achieved with the smallest possible number of digital steps allowed by a base clock within the TOF camera system, while the second or lowest frequency is made with several base clock ticks. Therefore, it is necessary to adjust only the second or lowest frequency (HALF in this case) to have its delay match the delay of the first or highest frequency (BF). Additionally, the remaining mismatch can be removed using a PLL or delay line. Alternatively, synchronisation can also be accomplished by rotating I and Q coordinates with a (2×2) times (2×1) matrix multiplication where the (2×2) matrix can be determined during calibration, or can be defined as a fixed matrix for a particular TOF camera system production line.

It is to be noted, however, that the first embodiment of the present invention has a clear limitation in that it can only detect up to twice the non-ambiguity or unambiguous distance obtainable at the first or original modulation frequency, that is, the BF signal. In a second embodiment of the present invention, the second frequency can be QUARTER frequencies, for example, for a first frequency BF of 20 MHz, the second or lowest frequency that can be used is 5 MHz. This provides extension of the range in which identification can be effected up to four times the aliasing distance range.

Figure 2:
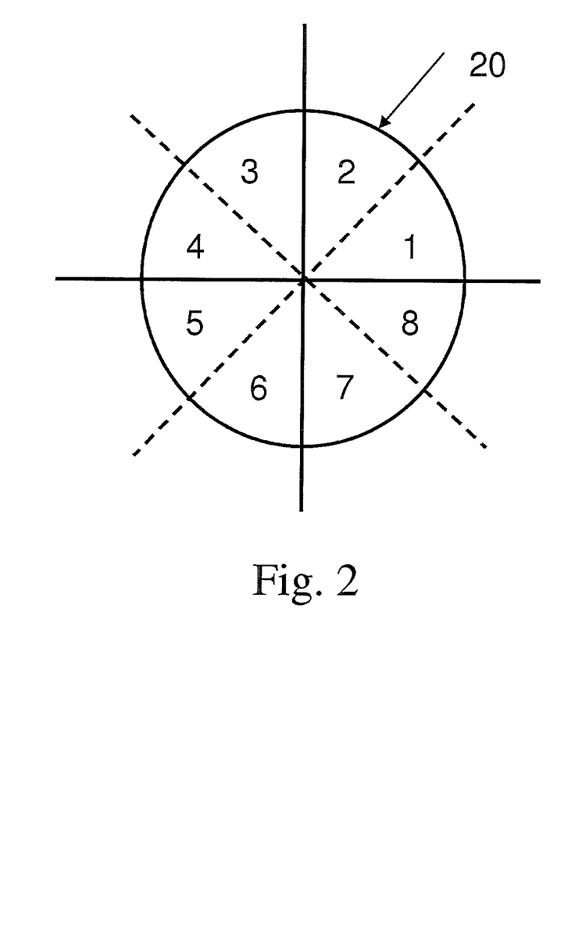
FIG. 2 is similar to FIG. 1 but has eight phase sectors.

FIG. 2 illustrates a circle 20 which has been divided into eight sectors 1, 2, 3, 4, 5, 6, 7 and 8 as shown. There are now eight possible cases as shown in Table 2 below that need to be checked to avoid jumping from one case to another due to the presence of noise in the measurements.

As in the HALF frequency case above, an implementation without redundancy, but prune to noise is possible. In this case this is based on dividing the QUARTER frequency in only 4 quadrants. Similar to the previous case, compensation for the noise impact can be provided using time coherency and/or coherency with adjacent pixels.

TABLE 2

| Case | BF_1 | BF_2 | BF_3 | BF_4 |
|---|---|---|---|---|
| QUARTER_1 | QUARTER_1 | QUARTER_1 | QUARTER_2 | QUARTER_8 |
| QUARTER_2 | QUARTER_3 | QUARTER_1 | QUARTER_2 | QUARTER_2 |
| QUARTER_3 | QUARTER_3 | QUARTER_3 | QUARTER_4 | QUARTER_2 |
| QUARTER_4 | QUARTER_5 | QUARTER_3 | QUARTER_4 | QUARTER_4 |
| QUARTER_5 | QUARTER_5 | QUARTER_5 | QUARTER_6 | QUARTER_4 |
| QUARTER_6 | QUARTER_7 | QUARTER_5 | QUARTER_6 | QUARTER_6 |
| QUARTER_7 | QUARTER_7 | QUARTER_7 | QUARTER_8 | QUARTER_6 |
| QUARTER_8 | QUARTER_1 | QUARTER_7 | QUARTER_8 | QUARTER_8 |

In Table 2, each row corresponds to second frequency QUARTER or the low-frequency sectors in the circle 20 and each column corresponds to the first frequency BF or high-frequency quadrant. The values in Table 2 correspond to the correct QUARTER. In this way, due to the measurement redundancy, up to 90° of the BF or high-frequency noise can be corrected.

In Table 2, cases 1 to 8 can be distinguished provided the following steps are carried out:
1) check the sign of I
2) check the sign of Q
3) check if I>Q As before, all these operations are simple comparison operations, but the constraints remain the same, namely, 90° of the first frequency BF or high-frequency signal which is equivalent to 22.5° of the second frequency QUARTER or low-frequency signal. This is also the reason why each of Tables 1 and 2 has four columns.

Distinguishing between case QUARTER_1 through QUARTER_8 for the lower frequency then helps identify:
QUARTER_1 or QUARTER_2: k belongs to [0; 4; 8; ... ]
QUARTER_3 or QUARTER_4: k belongs to [1; 5; 9; ... ]
QUARTER_5 or QUARTER_6: k belongs to [2; 6; 10; ... ]
QUARTER_7 or QUARTER_8: k belongs to [3; 7; 11; ... ]
The unambiguous distance is hereby extended a factor of 4. Therefore the reflectivity limit, needed to impose on the confidence threshold, will be reduced significantly, as was desired.

It will readily be appreciated that the present invention is not limited to second frequencies that are HALF or QUARTER frequencies and can be extended to other frequencies such as EIGHTH and lower fractional frequencies. However, there is an associated increase in computational requirements with EIGHTH or lower fractional frequencies are utilised as then the technique uses at least eight and preferred sixteen cases to be able to identify all aliasing patterns.

Extending the aliasing range up to four times the non-ambiguity or unambiguous interval of the BF or high frequency is already sufficient in many cases to achieve a fully de-aliased distance measurement or associated image. However, it will be appreciated that it is included within the scope of the present invention to extend further the non-ambiguity or unambiguous range of the TOF camera system.

Figure 3:
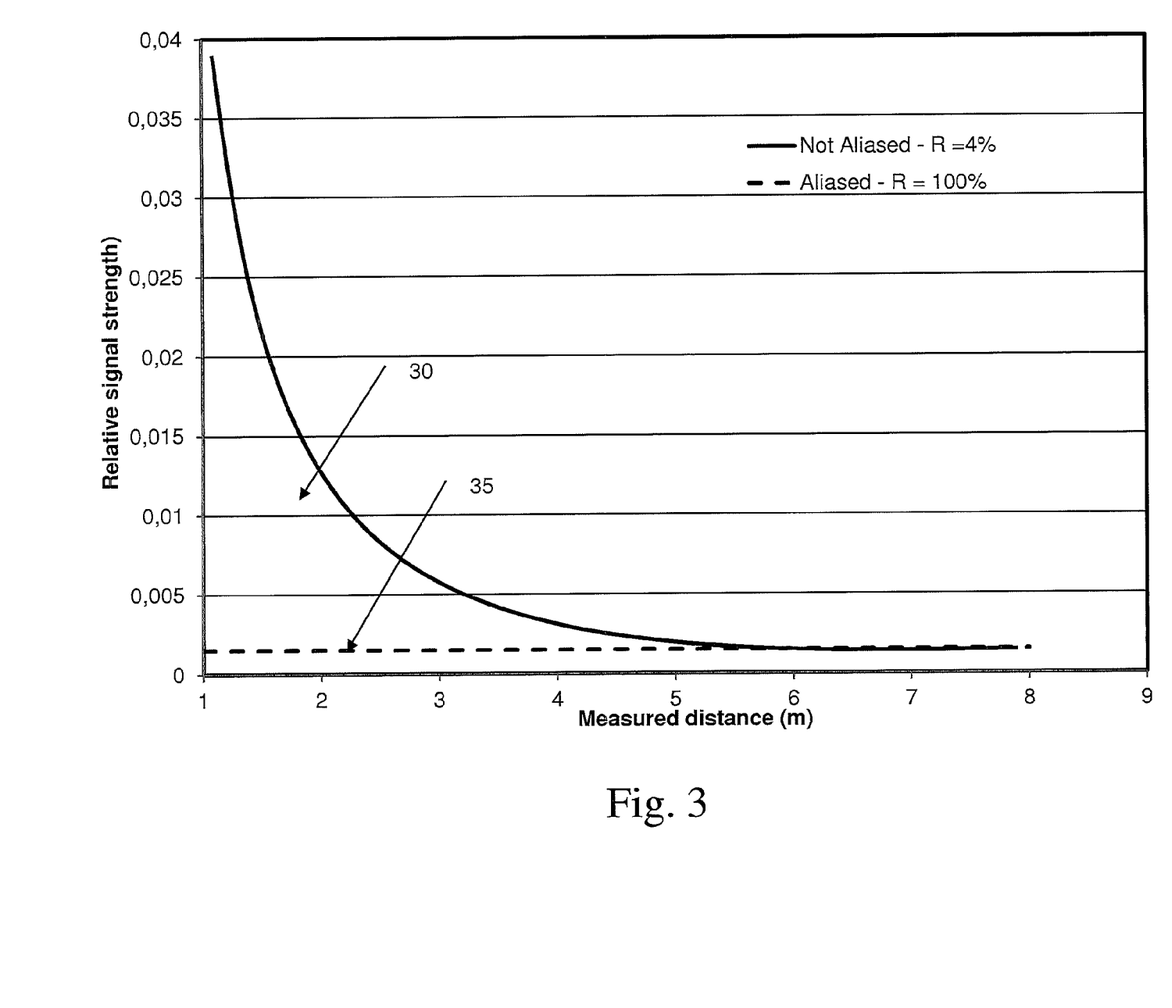
FIG. 3 illustrates a graph showing the effect of de-aliasing and reflectivity of objects within the scene.

The trade-off between reflectivity and distance is shown in FIG. 3 where a graph of relative signal strength is plotted against distance. Trace 30 relates to a non-aliased signal with a reflectivity of 4% and trace 35 relates to an aliased signal with a reflectivity of 100%.

It has been found, however, that when increasing the modulation frequency which is beneficial for the performance of the TOF camera system, extending the maximum range of the system by four times may not be adequate. If a first frequency BF of 100 MHz is used having a natural non-ambiguity or unambiguous distance of 1.5 m, using second frequencies that are QUARTER frequencies as described with reference to the second embodiment of the invention above, the non-ambiguity or unambiguous distance is now 6 m. If, however, due to the size of the region in which the TOF camera system is to operate limiting distance measurements to 3 m, the reflectivity limit becomes in first order 25% which makes distance determination for objects of lower reflectivity very difficult. Moreover, for systems where de-aliasing at a distance greater that 6 m is required, second frequencies that are QUARTER frequencies are therefore not sufficient.

As described above, second frequencies that are EIGHTH frequencies can be used for these situations but with a more complex comparison. As an alternative to a more complex comparison, an iterative technique can be used to extend the non-ambiguity or unambiguous distance.

An iterative method can be implemented which uses the second frequency as a HALF frequency as described above in the first embodiment of the invention. This extends the non-ambiguity or unambiguous distance by 100%, that is, multiplies the unambiguous distance obtained with first frequency BF by two. In a first iteration, the distance is extended by 100% (multiplied by two). In a second iteration, the distance is extended by another 100% (effectively multiplied by four) and in a third iteration, the distance is extended by another 100% (multiplied by eight). In each iteration, the sign of I and Q is determined so that the presence of aliasing in the measurements can be determined.

It will be appreciated that it is possible to perform the iteration indefinitely but tolerable noise limits must carefully be followed. The maximum acceptable noise for one step is 90°, but this must then be respected at all stages of this iterative process.

Alternatively, instead of using iterations of the second HALF frequencies, iterations can be performed for second QUARTER frequencies which allow a greater extension of distances over which objects can be measured with the same number of measurements. In addition, the iterations may be combined using both second HALF and QUARTER frequencies. It may also be possible to include second HALF frequencies in the iterations thereby extending the non-ambiguity or unambiguous distance further in other ways.

TOF measurements are typically implemented by taking multiple different measurements. These measurements differ in phase difference, or time delay difference, between the modulation signal emitted by the illumination source and the one received at the imaging sensor of the TOF camera system. These measurements may be termed "phase frames". Typically, 0°, 90°, 180° and 270° are used for the phase frames. Each of these measurements can be taken in parallel or sequentially. As the present invention requires one or more extra measurements to be taken, various ways of implementing these extra measurements are possible.

One method of implementing the extra measurements is to reduce the length of the measurement times for the phase frames, and add the extra measurements needed. In one implementation, four extra phase frames are needed, resulting in measurements at 0_HF, 90_HF, 180_HF, 270_HF, 0_LF, 90_LF, 180_LF, 270_LF where HF refer to high frequency and LF relates to low frequency. Typically, these measurements are taken sequentially and the measurement time needed for sufficient accuracy for de-aliasing is much lower for LF as compared to HF.

Another method is to add these extra measurements after each of the individual phase frames which results in measurements at 0_HF, 0_LF, 90_HF, 90_LF, 180_LF, 180_HF, 270_LF, 270_HF.

These measurements can also be taken in parallel if the system allows. The method of the present invention can be implemented using low-level electronics. Although the method can easily be implemented in a driver circuit on a host or even behind that, it is typically implemented in firmware running on a companion chip or field programmable gate array (FPGA). The method may also be integrated into integrated circuits (ICs) of the imaging sensor. Additionally, the method of the present invention is particularly useful as it is based on very simple comparative logic, rather than on difficult algebraic functions, such as, arctan (tan-1 or atan), square root (sqrt) etc.

The system of the present invention can be optimised by reducing the number of required measurements. In accordance with TOF theory, at least three measurements are preferred. It is therefore possible to measure only the 0° and 90° values together with a reference value. Here, the required I and Q values can be determined as follows:

$$I = M\_0° - \text{Reference}$$

$$Q = M\_90° - \text{Reference}$$

where M_0° and M_90° are the measurements taken at 0° and 90° respectively. Although the present invention has been described as using measurements taken at 90° intervals, for example, at 0°, 90°, 180° and 270°, it will be appreciated that other measurements could also be used. Measurement intervals may be 0°, 120° and 240° or any other suitable measurement intervals. Intervals 0°, 90°, 180° and 270° or 90°, 180°, 270° and 360° tend to be used if in-phase and quadrature signals are to be evaluated.

Figure 4:
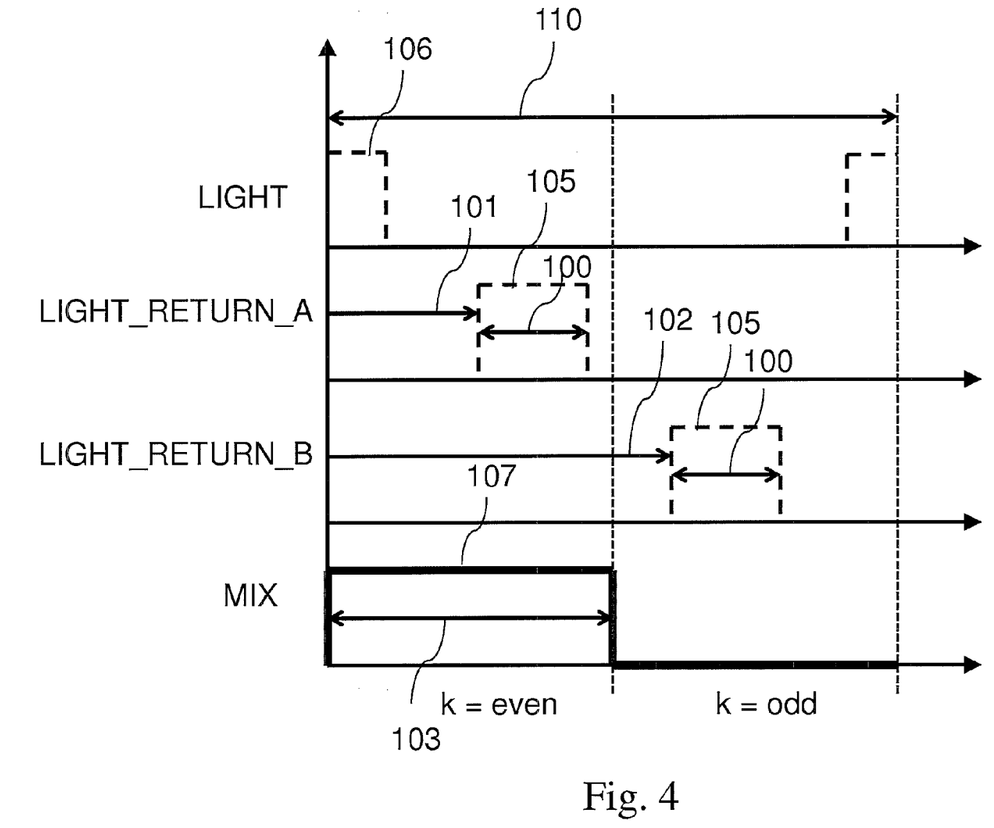
FIG. 4 illustrates a graph showing for one of the techniques the modulation signals for the light, their reflections as well as the needed signals to drive the mix input of the TOF multiplier.
Figure 6:
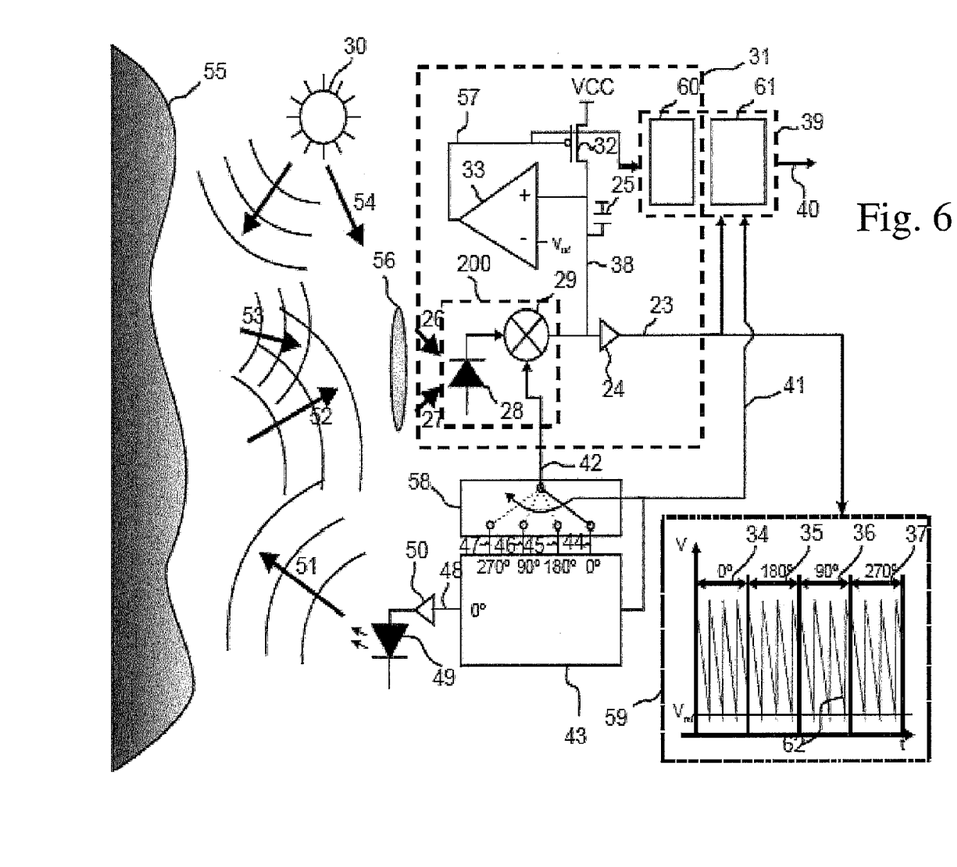
FIG. 6 illustrates a TOF camera according to an embodiment of the present invention.

In another implementation of the invention, for the added lower frequency measurement, a different duty cycle can be used for the modulation signal sent to the light source and the mix signal sent to mixer 29 in the sensor (see FIG. 6). An example frame with signals used for such an approach is shown in FIG. 4. The frame has a length 110, and, as typical in these kind-of measurement, to improve the signal-to-noise ratio, the shown frame is repeated multiple times for one measurement. A typical example of a number is 100 ns for frame length, and repeated a 1000 and integrated over an effective time of 100 us.

A signal, e.g. a pulse 106 with length 100, being e.g. half the period of the BF, is used as modulation signal of the illumination and the mixer of the sensor is driven with pulse 107 having duty cycle length 103, being bigger than pulse length 100, e.g. corresponding to the HALF frequency pulse length. Using such signals one can verify k being odd or even as follows:

1) A first Measurement (M1), with the MIX signals as indicated in FIG. 4
2) A second Measurement (M2), with the inverted MIX signal indicated in FIG. 4 M1>M2 will indicate k=even, as shown by RETURN_LIGHT_A in FIG. 4. M2>M1 will indicate k is odd, as shown by RETURN_LIGHT_B in FIG. 4.

Waveforms in FIG. 4 are preferably organized in such a way that the distance at which M1=M2, corresponds to the aliasing distance for the BF. For this reason the start of pulse 106, shown in FIG. 4, is phase shifted from the start of pulse 107 (as pulse 106 straddles the frame boundary and hence has a part at the beginning and part at the end of a frame. It is also to be noted that the smaller pulse width 100 is chosen, the more contrast is obtained on the value of k, however, as pulse width 100 is chosen shorter, less energy is emitted by the illumination and thus longer integration times are needed to obtain a certain noise level.

The advantage of this technique is that only two measurements have to be taken. No extra redundancy is needed. Thereby more time is available for executing the actual TOF distance measurement.

Figure 5:
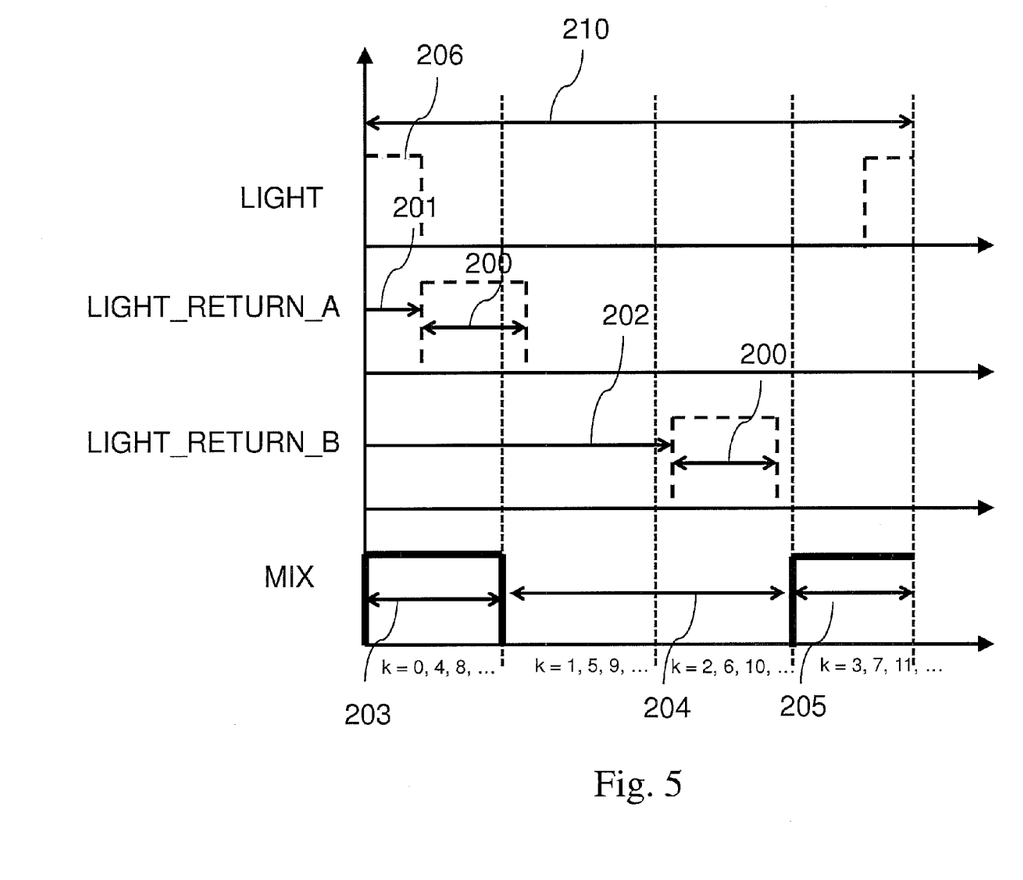
FIG. 5 illustrates a graph showing for another one of the techniques the modulation signals for the light, their reflections as well as the needed signals to drive the mix input of the TOF multiplier.

An example frame with signals used for a more generic approach of the above duty cycle variation technique is shown in FIG. 5. Again the frame has a length, 210, and is to be seen as continuously repeated during extra measurement for dealiasing. Pulse length 203, can be chosen arbitrary to check on k, e.g. pulse length 203 can be chosen to correspond to the aliasing distance, and pulse length 204 to correspond with 2× the aliasing distance, thereby allowing to check up-on k as follows:

1) Measure M1, with the MIX signals as indicated in FIG. 5
2) Measure M2, with the inverted MIX signal indicated in FIG. 5

M1>M2 will indicate k belongs to [0; 3; 4; 7; 8; 11 . . . ]
M2>M1 will indicate k belongs to [1; 2; 5: 6; 9: 10; . . . ]

Therefore an extension of the unambiguous distance can be up to k=2 (k=3 will be similar to k=0), with only two extra measurements.

It is to be noted, that the above is an example, and that in similar ways any verification on k, including non-integer, can be verified by choosing different pulse length 203 and 204, as can be configured by a person skilled in the art. Also, similar as the previous techniques, this technique could be made iterative, in order to further extend the unambiguous distance.

It is again to be noted that the smaller pulse width 200 is chosen, the more contrast is obtained on the value of k, however, as pulse width 200 is chosen shorter, less energy is emitted by the illumination and thus longer integration times are needed to obtain a certain noise level.

It is important that the MIX signal waveform on average still has a balanced duty cycle of 50%. This is primarily to make sure the background light is balanced and cancelled out during the different needed TOF measurements. It is as an example achieved extending the pulse, so that the MIX signal is high at the beginning and the end of the period as shown in FIG. 5. Pulse length 205 in the beginning actually preceded by pulse length 203 (at the end of the previous frame), the sum of both equals 204 in order to be balanced.

FIG. 6 shows another embodiment of a TOF camera or range finding system according to the present invention. The range finding system comprises a light source 49 for emitting periodic light 51 onto a scene 55, preferably focussed onto an area of interest, where the light is reflected. Periodic light 51 includes two detectably different frequencies—a first or base frequency and a second lower frequency. The range finding system further comprises at least one pixel 31 for receiving reflected light. The reflected light will also contain signal components, e.g. pulses, at the first and second frequencies. In order for the light source 49 to emit modulated light, a signal generator 43 is provided. The signal generator 43 generates a signal or modulation signal on node 48 that is preferably permanently oscillating at a predetermined first or base frequency, e.g. at about 10 MHz. This signal generator 43 also generates similar second to fifth clock signals which are delivered onto nodes 44, 45, 46, 47, respectively, having a 0°, 180°, 90° and 270° phase relation with the first clock signal on node 48. A person skilled in the art can also consider using other or more clock phases in the operation scheme, more clock phases leading towards better measurement precision in exchange for a longer measurement time. The signal generator also generates signals at a second or lower frequency. So the signal generator generates first to fifth clock signals at the second or lower frequency. This can be achieved for example by generating signals at the first or base frequency but altering the amplitude of the base frequency signal (e.g. increasing it) at regular intervals e.g. at a frequency that is a fraction of the base frequency. For example, the second frequency can be $2^{-n}$ of the first frequency where n=1, 2, . . . etc. By filtering either the signals at the first or second frequency can be extracted from the modulation signal, e.g. also from the reflected signals from the object under view.

The signal generator 43 can also generate a control signal 41 that is determining for a modulation signal alteration means to change the modulation signal, e.g. a control signal 41 that is determining for a selector 58 to select between the second to fifth clock signals, i.e. between the different phases of the clock signal. Selector 58 is switching sequentially between these four phases connecting the input node 42 of a mixer 29 of a detector and mixer stage 200 with the second to fifth clock signals on nodes 44, 45, 46 and 47 sequentially. At each of these positions selector 58 can stay connected for a relaxation period of e.g. about 1 ms.

Buffer 50 drives the light source 49 that emits its light 51 onto the scene 55, preferably focused on the area of interest. Part of this light will be reflected, thus generating reflected light 52. This reflected light 52 then arrives on an optical focussing system such as a lens 56, through which it is imaged or focussed on a detector 28 inside pixel 31, where the incident fraction is called the reflected modulated light (ML) 27.

Indirect light 53 and direct light 54, both originating from secondary light sources 30 not intended for the TOF measurement, will also be present in the scene, impinge on the optical focussing system 56 and thus be focused on the detector 28. The part of this light entering detector 28 will be called background light (BL) 26. Light sources 30 generating BL include incandescent lamps, TL-lamps, sunlight, daylight, or whatever other light that is present on the scene and does not emanate from the light source 49 for TOF measurement.

ML 27 and BL 26 impinge onto the photodetector 28, and generate, respectively, an ML-current and a BL-current, which are photo-induced current responses to the impinging BL 26 and ML 27. Detector 28 outputs these currents to a subsequent mixing means, e.g. mixer 29, for mixing the current responses to the impinging BL 26 and ML 27 with the phase-shifted clock signal on input node 42. This BL 26 can induce a BL-current of up to 6 orders of magnitude higher than the ML-current induced by the ML 27 received for TOF measurements.

Detector 28 and mixer 29, forming detector and mixer stage 200, can as well be implemented as one single device, for example as described in EP1513202A1, where the photo-generated charges are mixed generating the mixing product current at once. The detector and mixer stage 200 will generate the mixing products of the current responses to the impinging BL 26 and ML 27 with phase-shifted clock signals, and these signals are being integrated on node 38 by means of an integrator, for example implemented with a capacitor 25, which preferably is kept small, e.g. the parasitic capacitance of the surrounding transistors. During integration, an automatic reset of the mixer output signal on the integrator node 38 is performed. This is performed for both the first and second frequencies.

This may for example be implemented by a comparator 33 triggering a reset switch, e.g. reset transistor 32, so that the mixer output signal on node 38 is automatically reset whenever it reaches a reference value Vref, thus avoiding saturation.

In alternative embodiments, not illustrated in the drawings, the automatic reset of the mixer output signal on the integrator node 38 can be implemented in several other ways. One of them is triggering a charge pump, instead of the reset switch 32, to add a fixed amount of charges to capacitor 25 yielding a better noise performance at the cost of some more complexity.

The mixing products forming the mixer output signal are available in a sequential form synchronised with the modulation signal alteration means, in the example illustrated selector 58, at integrator node 38. An output driver 24, e.g. a buffer, provides a voltage gain substantially of one and current amplification so as to provide a stronger output signal at output node 23.

By filtering either the signals at the first or second frequency can be extracted from the reflected signals from the object under view.

While the invention has been illustrated and described in detail in the drawing and foregoing description, such illustration and description are to be considered illustrative or exemplary and not restrictive; the invention is not limited to the disclosed embodiments. Other variations to the disclosed embodiments can be understood and effected by those skilled in the art in practising the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention claimed is:

1. A method of determining the presence of aliasing or avoiding aliasing within certain limits in correlation measurements in a time-of-flight system having an imaging sensor and being for use with an illumination unit, the illumination unit being adapted to illuminate a scene with modulated light, the system being adapted to obtain correlation measurements between a correlation signal and modulated light reflected from the scene, the method comprising:
   a) detecting reflected light from at least one object in the scene;
   b) determining by one or more first correlation measurements a first correlation between a first correlation signal and the reflected light received at the imaging sensor the first correlation signal having a periodic waveform of a first frequency and the first correlation measurement providing a value of a parameter related to a distance from the imaging sensor to the at least one object;

c) determining by one or more second correlation measurements a second correlation between the reflected light received at the imaging sensor and a second correlation signal, the second correlation signal having a periodic waveform of a second frequency lower than the first frequency;

d) determining for that value of the parameter the presence of aliasing from the second correlation measurement, and wherein the first and/or second correlation measurements are combined into aliasing indicators, the presence of aliasing is determined from indicators being the sign of the in-phase and/or quadrature components of the detected reflected light.

2. The method of claim 1, wherein a first phase measurement is determined front the first correlation measurement at different phase offsets for the first frequency and optionally a second phase measurement is determined from the second correlation measurement at different phase offsets for the second frequency.

3. The method of claim 1, wherein a signal integration time of the detected reflect signal in the first correlation measurement is longer than a signal integration time of the second correlation measurement.

4. The method of claim 1, wherein second correlation signal has a different duty cycle from the duty cycle of the detected reflected modulated light with which it is correlated and the duty cycle of the second correlation signal is optionally 50%.

5. The method of claim 1, further comprising the steps of:
determining the second correlation measurement using different phase offsets for the second frequency; and
determining in-phase and/or quadrature components of the detected reflected light from the one or more second correlation measurements, and using the in-phase and/or quadrature components to determine a presence of aliasing.

6. The method of claim 1, wherein the presence of aliasing is determined by using a confidence level determined from measuring a distance related factor, whereby the distance related factor is optionally an amount of reflected light, a size of a speckle pattern, a size of an imposed pattern.

7. The method of claim 5, wherein the step of determining in-phase and/or quadrature components comprises determining I and Q values at the first frequency and/or the second frequency, and/or the difference of I and Q absolute values.

8. A method of determining the presence of aliasing or avoiding aliasing within certain limits in correlation measurements in a time-of-flight system having an imaging sensor and being for use with an illumination unit, the illumination unit being adapted to illuminate a scene with modulated light, the system being adapted to obtain correlation measurements between a correlation signal and modulated light reflected from the scene, the method comprising :

a) detecting reflected light from at least one object in the scene;

b) determining by one or more first correlation measurements a first correlation between a first correlation signal and the reflected light received at the imaging sensor the first correlation signal having a periodic waveform of a first frequency and the first correlation measurement providing a value of a parameter related to a distance from the imaging sensor to the at least one object;

c) determining by one or more second correlation measurements a second correlation between the reflected light received at the imaging sensor and a second correlation signal, the second correlation signal having a periodic waveform of a second frequency lower than the first frequency;

d) determining for that value of the parameter the presence of aliasing from the second correlation measurement; and wherein the second correlation signal is a pulse-shaped MIX signal, starting with a pulse of a first length, followed by a pulse of a second length and ended with a pulse of a third length to balance the duty cycle of the second correlation signal to be 50%.

9. A method according to claim 8, wherein the pulse of a first length corresponds to the aliasing and the pulse of the second length corresponds to two times the aliasing distance.

10. A time of flight or range finding sensor unit, having means for determining the presence of aliasing or to avoid aliasing within certain limits, the sensor being for use with an illumination unit, the illumination unit being adapted to illuminate the scene with modulated light, the system being adapted to obtain correlation measurements between a correlation signal and modulated light reflected from the scene, the sensor unit comprising:

a) first means for detecting reflected light from at least one object in the scene;

b) second means for determining by a first correlation measurement a first correlation between the first signal and the reflected light received at the imaging sensor, the first correlation measurement providing a value of a parameter related to a distance from the imaging sensor to the scene;

c) third means for determining by a second correlation measurement a second correlation between the reflected light received at the imaging sensor and a second signal, the second signal having a periodic waveform of a second frequency lower than the first frequency;

d) fourth means for determining, for that value, the presence of aliasing from the second correlation measurement, and wherein:

the third means for determining the second correlation is adapted to perform the second correlation measurement at different phase offsets for the second frequency; and wherein the sensor unit is adapted to determine in-phase and/or quadrature components of the detected reflected light from the second correlation measurement, and the fourth means using the in-phase and/or quadrature components to determine the presence of aliasing, whereby the presence of aliasing is determined optionally by using a confidence level determined from a distance related factor, the distance related factor optionally being the amount of reflected light modulated at the first frequency and/or second frequency, the size of a speckle pattern, the size of an imposed pattern and wherein the means for determining in-phase and/or quadrature components is optionally adapted to determine the presence of aliasing from the sign of the in-phase and/or quadrature components of the detected reflected light.

11. The sensor unit of claim 10, wherein the second means is adapted to determine a first phase measurement from the first correlation measurement at different phase offsets for the first frequency, or wherein the third means for determining is adapted to make a phase measurement from the second correlation at different phase offsets for the second frequency, or wherein the second and third means are adapted so that a signal integration time of the first correlation measurement is longer than an integration time of the second correlation measurement.

12. The sensor unit of claim 10, wherein second correlation signal has a different duty cycle from the duty cycle of the detected reflected modulated light with which it is correlated and optionally wherein the duty cycle of the second signal is 50%.

13. The sensor unit of claim 10, wherein the fourth means for determining in-phase and/or quadrature components is adapted to determine I and Q values at the second frequency, or wherein the fourth means for determining in-phase and/or quadrature components is adapted to determine the presence of aliasing by determining the sign of the I and/or Q values.

14. The sensor unit according to claim 10, wherein the first and/or second signal is calibrated for a phase offset.

15. A TOF camera with a sensor unit of claim 10.

* * * * *